Dec. 28, 1965 AKIRA KURODA 3,226,572
TRIGGER CIRCUITS
Filed Feb. 20, 1963 2 Sheets-Sheet 1

Dec. 28, 1965 AKIRA KURODA 3,226,572

TRIGGER CIRCUITS

Filed Feb. 20, 1963 2 Sheets-Sheet 2

United States Patent Office 3,226,572
Patented Dec. 28, 1965

3,226,572

TRIGGER CIRCUITS

Akira Kuroda, Kawasaki-shi, Japan, assignor to Fujitsu Limited, Kawasaki, Japan, a corporation of Japan Filed Feb. 20, 1963, Ser. No. 259,974
Claims priority, application Japan, Feb. 24, 1962, 37/7,163
8 Claims. (Cl. 307—88.5)

This invention relates to trigger circuits particularly for setting and resetting flip-flops in response to a clock pulse and other input signals.

Conventionally the set and reset trigger signals for flip-flop circuits are developed by independent logic circuits. Alternately the reset signal is derived from the inverse voltage of the set signal. Whether the circuit for the reset signal is independent or whether it constitutes the negative of the set signal, conventional circuits for this purpose are complicated and costly due to the extra components required to operate the transistors comprising the independent logic circuits or the inverter circuits. Furthermore the extra needed transistors slow down the computation time.

It is an object of this invention to obviate the faults of such conventional trigger circuits. More particularly, it is an object to furnish set and reset signals for flip-flops without supplementary transistors for amplification or signal inversion.

Another object of the invention is to provide reset trigger circuits which form a part of the logic circuit triggering the flip-flop.

According to a feature of my invention, I control two trigger circuits by a common pulse, one trigger circuit for converting input signals to form a set pulse, and the other a circuit corresponding to the inverter circuit to produce a reset pulse, and I connect the second circuit across the clock pulse input and output of the first circuit so as to be effective only when the first circuit is ineffective.

According to another feature of my invention, I trigger a flip-flop circuit with a logic AND circuit having a plurality of input terminals at least one of which is adapted to connect to a pulse input, and I connect energy storage means between one of the inputs and the output of the AND circuit by circuit means, and I derive reset pulses from the one input by connecting the energy storage means to a reset point on the flip-flop. More particularly, the energy storage means constitutes a capacitor and the circuit means constitutes a resistor connected in series with the capacitor, the capacitor being connected to the one input and the resistor being connected to the one output of the AND circuit, whereas the connection to the reset point of the flip-flop is taken from the junction of the capacitor and resistor.

These and other features of the invention are pointed out in the claims forming a part of this specification. Other objects and advantages of the invention will become obvious from the following detailed description when taken in the light of the accompanying drawings wherein:

Figure 1:
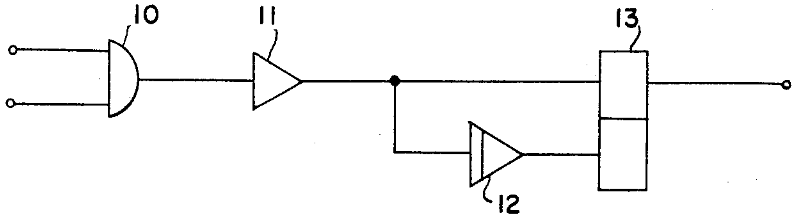
FIG. 1 is a block diagram of a conventional trigger circuit and a flip-flop.

In FIG. 1, showing an example of the prior art, the output of a logic AND circuit 10 is amplified by an amplifier 11 and inverted by an inverter 12 before being applied to a flip-flop 13. The amplified signal from amplifier 11 is also applied directly to the flip-flop 13.

Such a circuit is generally used to trigger a flip-flop. It requires at least two transistors in addition to the flip-flop 13 to serve as amplifier 11 and inverter 12. This increases the cost of the circuit and at the same time slows its operation and calculating speed. These difficulties are obviated by the circuit of FIG. 2 which embodies features of the invention.

Figure 2:
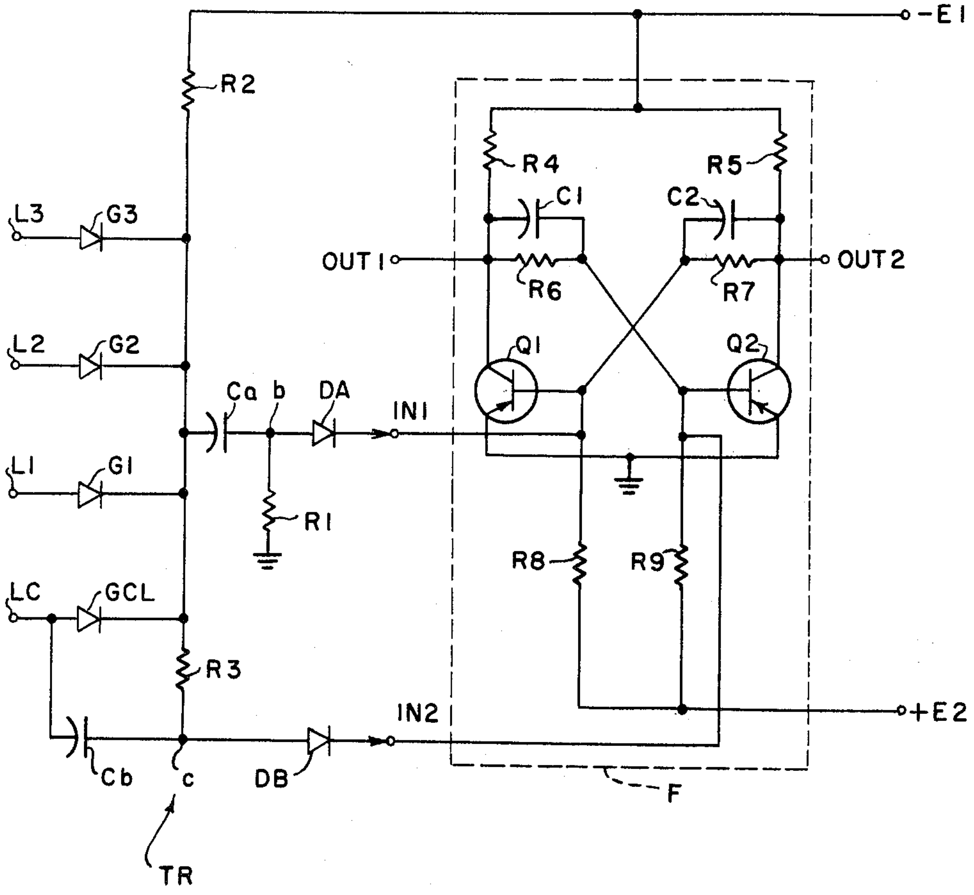
PRIOR ART FIG. 2
FIG. 2 is a schematic circuit diagram showing a flip-flop and a trigger embodying features of this invention.

In FIG. 2, a flip-flop FF possesses two input terminals IN1 and IN2 and two output terminals OUT1 and OUT2 as well as a pair of transistors Q1 and Q2 having respective emitters each connected to ground. A pair of load resistors R4 and R5 connect the respective collectors of transistors Q1, Q2 to a negative supply terminal designated −E1. Also connected to the collectors are the output terminals OUT1 and OUT2. Base-bias resistors R8 and R9 connect the bases of transistors Q1 and Q2 respectively to a positive voltage +E2. A pair of biasing resistors R6 and R7 cross-connect the base of transistor Q2 with the collector of transistor Q1 and the base of transistor Q1 with the collector of transistor Q2, and have respective capacitors C1 and C2 connected thereacross. The inputs IN1 and IN2 to the flip-flop FF connect respectively to the bases of transistors Q1 and Q2.

The flip-flop operates in conventional manner so that an appropriate trigger signal applied to the input terminal IN1 or IN2 changes it from one of its stable states to the other stable state. When one of the two transistors Q1 and Q2 conducts, the other one is non-conductive.

Forming an AND circuit are a plurality of diodes G1, G2, G3 and GCL connected to a common output terminal *a* and having respective input terminals L1, L2, L3 and LC, of which the input terminal LC connects to a clock pulse device. The common output terminal *a* connects to the voltage terminal −E1 by a resistor R2. A charging capacitor C*a* connects the terminal *a* to the point *b* and forms an RC circuit with a charging resistor R1 connecting to ground. Voltage from the point *b* is provided to the input terminal IN1 by a diode DA.

Connected across the diode GCL is a capacitor C*b* and a series charging resistor R3. Their junction is designated *c* and constitutes an output point for a pulse which is applied to the input IN2 by means of a diode DB.

Figure 3:
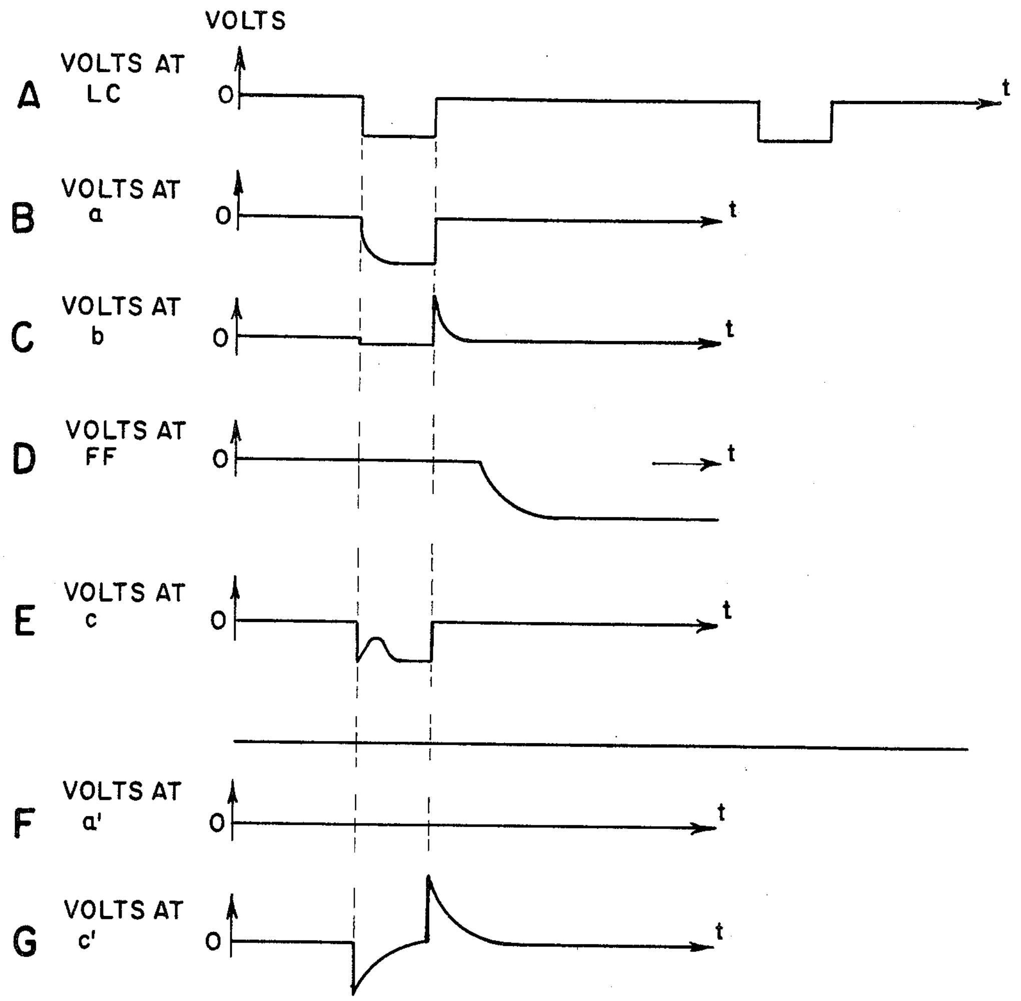
FIG. 3 is a group of time voltage curves A to G of voltages appearing at various points in the schematic diagram in FIG. 2 for various conditions of inputs.

The voltage wave forms appearing at the various points in the circuit for particular operations are indicated in FIG. 3 by the time voltage graphs A to G. The graph A indicates the voltage of the clock pulses at terminal LC. The graph B illustrates the voltage pulses at terminals *a* when an input exists at all the terminals L1, L2, L3 and LC. The curve C illustrates the voltage at point *b* for this condition while the curve D indicates the voltage wave form of the flip-flop FF. The voltage wave form at point *c* is illustrated for the condition of input pulses at all input terminals by the curve E. When there is an absence of a negative input at one of its input terminals in the AND circuit, the voltage at *a* is shown by curve F and the voltage at *c* is shown by the curve G.

The trigger circuit according to the invention is generally designated TR in FIG. 2 and can be applied to any bistable multivibrators, the present diagram being merely an example.

In operation, the flip-flop trigger circuit TR is comprised of two functional parts. One part furnishes a trigger signal to the input terminal IN1 of the flip-flop FF and consists of the AND circuit G1, G2, G3, GC1 which takes the logic product of signals from the inputs L1, L2 and L3 and a clock pulse at LC. Trigger signals are furnished to the input terminal IN1 of flip-flop FF by trigger condenser *Ca* and trigger diode DA together with charging resistor R1.

When a negative clock pulse is applied to the input terminal LC and all negative input signals are applied to the logic circuit simultaneously, the potential of terminal *a* in FIG. 2 changes as shown in curve B. Prior to such simultaneous negative inputs the potential at terminal *a* remained at a level of zero corresponding to the zero voltage of at least one of the inputs L1, L2, L3 or LC. The sudden application of a negative pulse to all the inputs causes the zero potential of the capacitor *Ca* to leak off through the resistor R2 and approach the negative level −E1. The voltage at *b* changes only slightly from its ground level. However, at the end of the clock pulse when a zero potential is again applied to *a*, the voltage at point *b* rises suddenly and stays positive until capacitor *Ca* charges again through the resistor R1. The positive pulse is transmitted to the flip-flop through the diode DA thereby rendering the transistor Q1 non-conductive. The operation of the flip-flop is shown in curve D.

At the beginning of the clock pulse the voltage at the point *c* decreases to the negative value of the clock pulse and the capacitor *Cb* begins to discharge through the resistor R3 toward the value of voltage at point *a*. However, as the voltage at terminal *a* decreases, the voltage at point *c* also decreases. At the end of the clock pulse the voltage at *c* returns to the zero value. This action is shown by the wave form of curve E and, since the potential of point *c* does not exceed zero volts even at the trailing edge of the clock pulse, no trigger passes diode DB.

When the signal of the logic circuit is zero at point *a*, as shown in curve F, due to the absence of a signal at any one of the inputs L1, L2 or L3, the clock pulse at terminal LC affects the point *c* as shown in curve G. This generates a trigger pulse through the diode DB and serves to render the transistor Q2 non-conductive so as to reset the flip-flop FF.

While an embodiment of the invention has been described in detail, it will be obvious to those skilled in the art that the invention may be practiced otherwise without departing from the spirit and scope of the invention.

I claim:

1. A circuit for producing trigger pulses, comprising a logic AND circuit having a plurality of input terminals and an output terminal, one of said input terminals supplying a clock pulse to said AND circuit, circuit means connecting said one of said input terminals to the output terminal of said AND circuit to produce pulses only when a clock pulse is supplied via said one of said input terminals and when said AND circuit is ineffective, and means for deriving a trigger pulse from said circuit means.

2. A circuit for producing trigger pulses, comprising a logic AND circuit having a plurality of input terminals and an output terminal, one of said input terminals supplying a clock pulse to said AND circuit, differentiating circuit means connected in parallel with said one of said input terminals and being connected to the output terminal of said AND circuit, said differentiating circuit producing pulses only when a clock pulse is supplied via said one of said input terminals and when said AND circuit is ineffective, said differentiating circuit having an output, and output means for deriving a trigger pulse from said output.

3. A circuit for producing trigger pulses, comprising a logic AND circuit having a plurality of input terminals and an output terminal, one of said input terminals supplying a clock pulse to said AND circuit, a capacitor, a resistor, and circuit means connecting said capacitor and said resistor in series between said one of said input terminals to said AND circuit and to the output terminal of said AND circuit, and means for deriving a trigger pulse from said capacitor.

4. A circuit for producing trigger pulses, comprising a logic AND circuit having a plurality of input terminals and an output terminal, one of said input terminals supplying a pulse to said AND circuit, a capacitor, a resistor, circuit means connecting said capacitor and said resistor in series and connecting said capacitor to said one of said input terminals and connecting said resistor to the output terminal of said AND circuit, and output means for deriving a trigger pulse from a common point in the connection between said resistor and said capacitor, said output means including a diode.

5. A trigger circuit for setting and resetting a flip-flop, comprising an AND circuit having a plurality of input terminals and an output terminal connected to the flip-flop for setting it, one of said input terminals supplying a clock pulse to said AND circuit, circuit means connected in parallel with said one of said input terminals and being connected to said output terminal to produce pulses only when a clock pulse is supplied via said one of said input terminals and when said AND circuit is ineffective, and output means for deriving a trigger pulse from said circuit means and for applying pulses to reset said flip-flop.

6. A trigger circuit for setting a flip-flop in response to clock pulses and a plurality of inputs and for resetting the flip-flop in response to the clock pulses, comprising a logic AND circuit including a plurality of diodes and means connecting said diodes to form a single output terminal for supplying set pulses to said flip-flop, each diode forming an input terminal for the respective inputs, one of said input terminals supplying a clock pulse to said AND circuit, differentiating circuit means connected in parallel with said one of said input terminals and being connected to said output terminal to produce pulses only when a clock pulse is supplied via said one of said input terminals and when said AND circuit is effective, said differentiating circuit means having an output terminal, and output means for deriving a trigger pulse from said differentiating circuit means and for applying pulses to reset said flip-flop.

7. A trigger circuit for setting a flip-flop in response to clock pulses and a plurality of inputs and for resetting the flip-flop in response to the clock pulses, comprising a logic AND circuit including a plurality of diodes and means connecting said diodes to form a single output terminal for supplying set pulses to said flip-flop, each diode forming an input terminal for the respective inputs, one of said input terminals supplying a clock pulse to said AND circuit, a capacitor, a resistor, circuit means connecting said capacitor and said resistor in series between said one of said input terminals and said output terminal, and output means for deriving a trigger pulse from a common point in the connection between said capacitor and said resistor and for applying pulses to reset said flip-flop, said output means including a diode.

8. A trigger circuit for setting a flip-flop in response to clock pulses and a plurality of inputs and for resetting the flip-flop in response to the clock pulses, comprising a logic AND circuit including a plurality of diodes and means connecting said diodes to form a single output terminal for supplying set pulses to said flip-flop, each diode forming an input terminal for the respective inputs, one of said input terminals supplying a clock pulse to said AND circuit, a capacitor, a resistor, circuit means connecting said capacitor and said resistor in series between said one of said input terminals and said output terminal, and output means for deriving a trigger pulse from a common point in the connection between said capacitor and said resistor and for applying pulses to reset said flip-flop, said output means including a diode, a resistance-capacitance circuit having a second capacitor, second resistor, and means connecting said second resistor and said second capacitor, said resistance-capacitance circuit being connected to said output terminal and to said flip-flop, and a second diode for deriving a trigger pulse from a common point in the connection between said second capacitor and said second resistor and for applying said trigger pulse to said flip-flop to set it.

References Cited by the Examiner

UNITED STATES PATENTS 3,091,737 5/1963 Tellerman et al. ---- 307—88.5 X

ARTHUR GAUSS, *Primary Examiner.*